Figure 1:
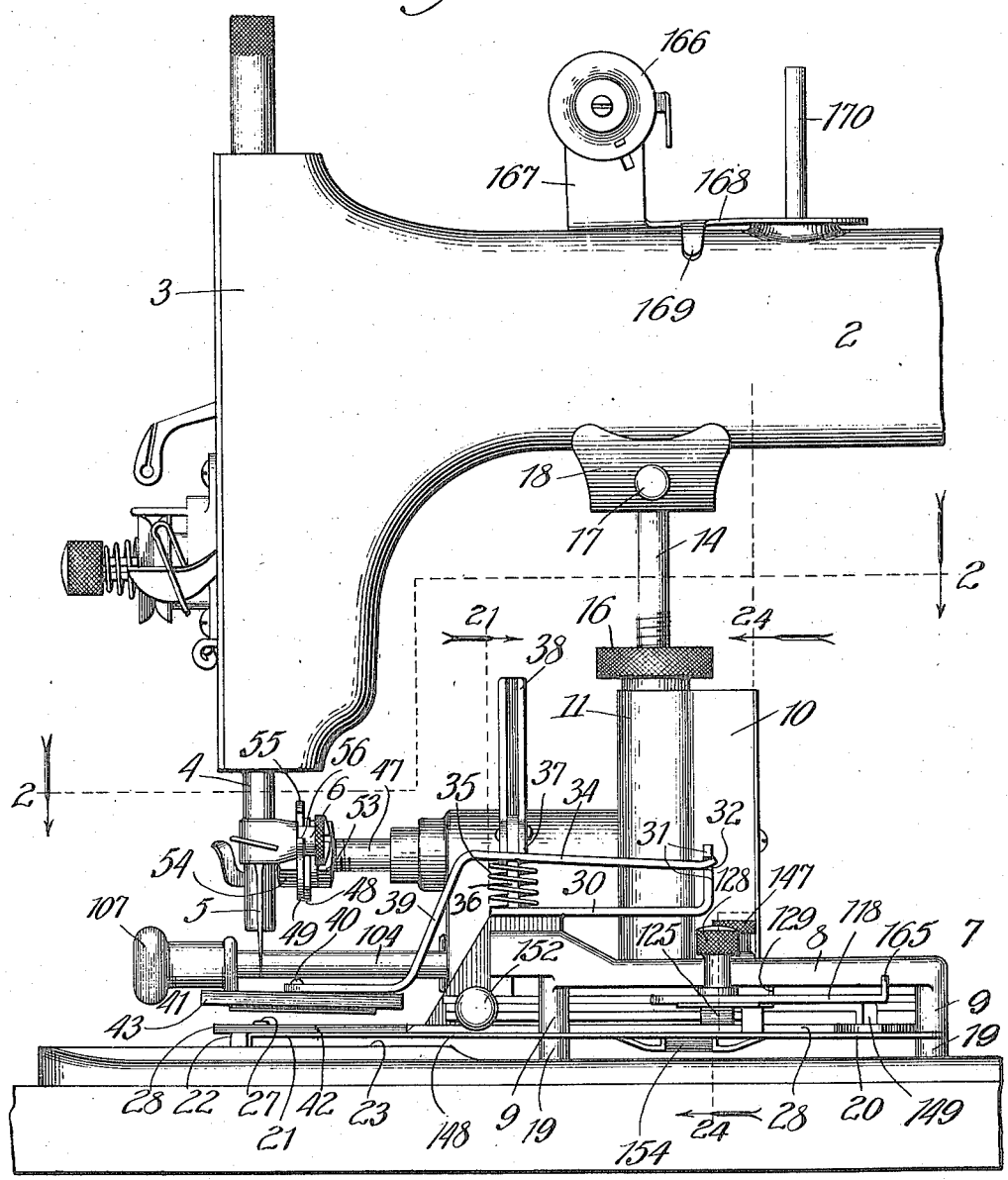

W. MAECHLER.
BUTTONHOLE ATTACHMENT FOR SEWING MACHINES.
APPLICATION FILED MAY 16, 1913.

1,157,791.

Patented Oct. 26, 1915.

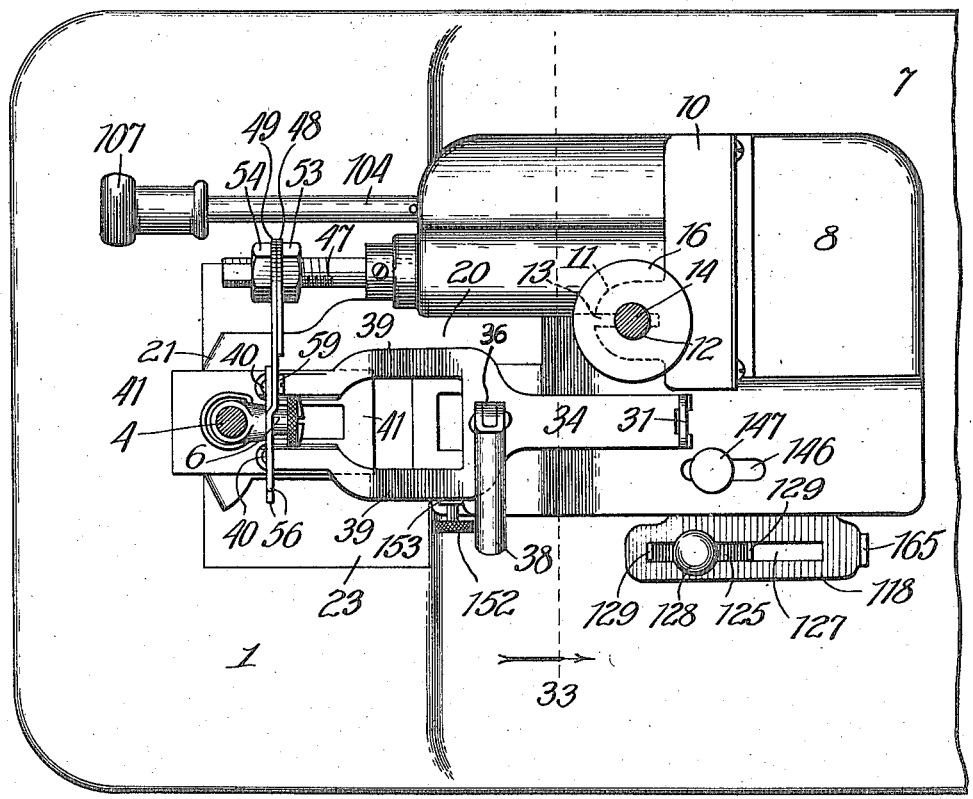
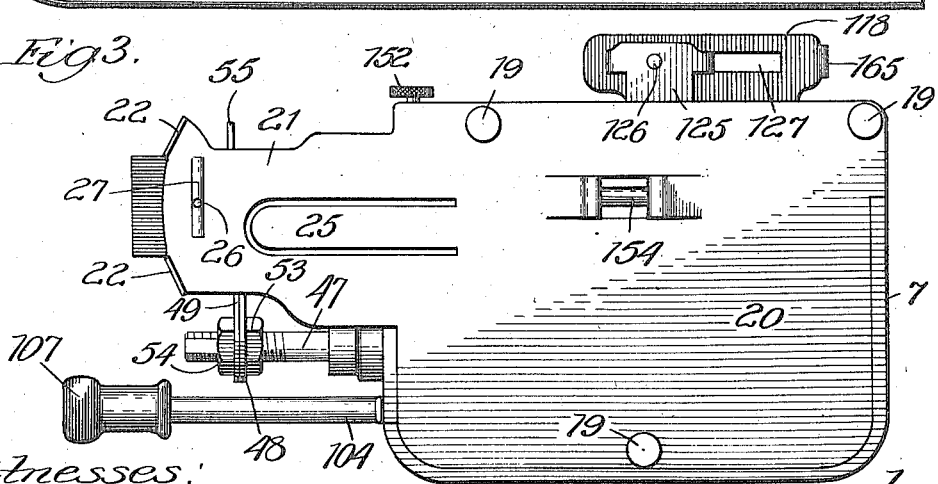

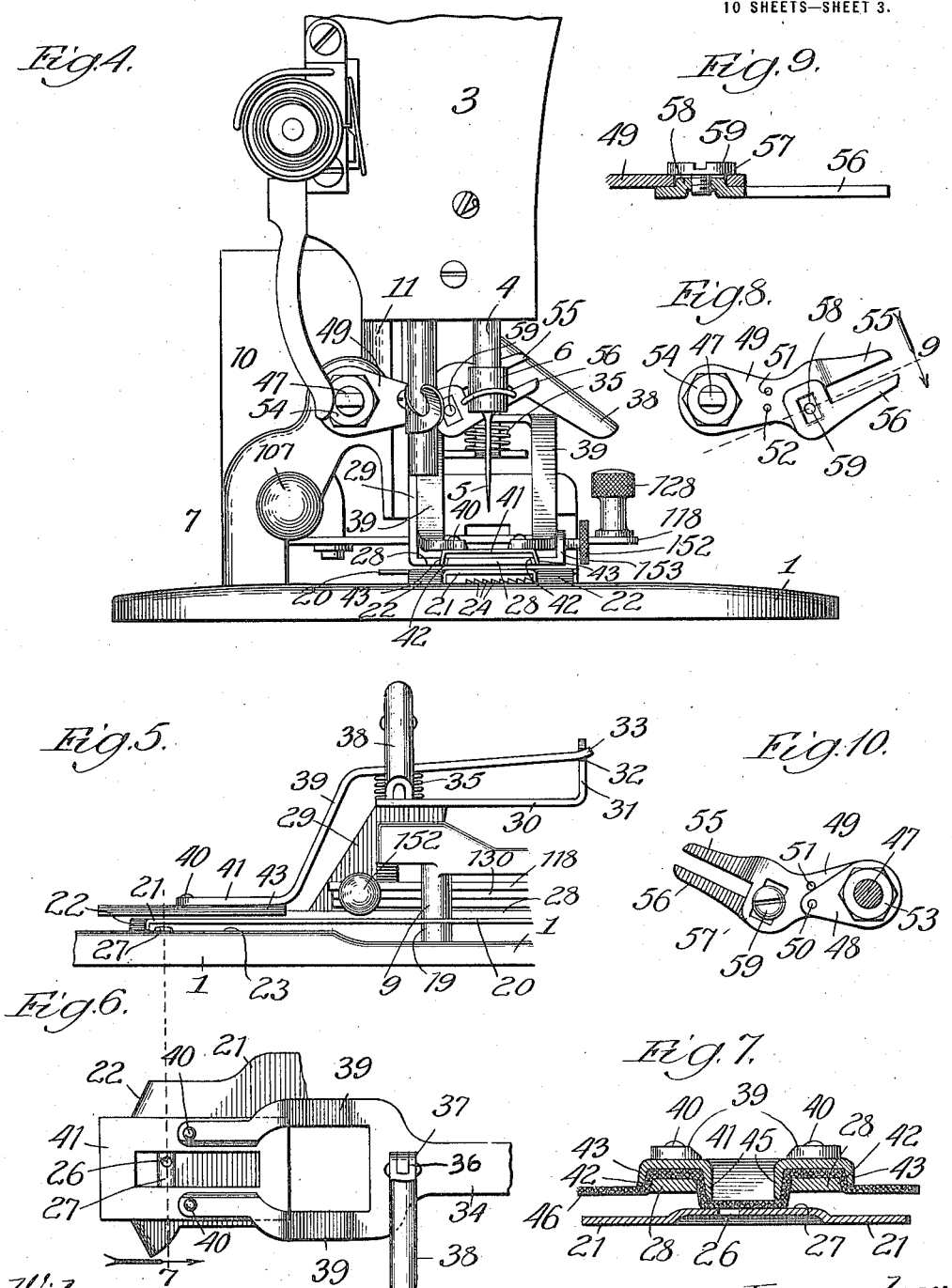

W. MAECHLER.
BUTTONHOLE ATTACHMENT FOR SEWING MACHINES.
APPLICATION FILED MAY 16, 1913.

1,157,791.   Patented Oct. 26, 1915.
10 SHEETS—SHEET 4.

Witnesses:

Inventor:
Walter Maechler.
By David W. Fletcher.
Atty.

W. MAECHLER.
BUTTONHOLE ATTACHMENT FOR SEWING MACHINES.
APPLICATION FILED MAY 16, 1913.
1,157,791.  Patented Oct. 26, 1915.
10 SHEETS—SHEET 5.
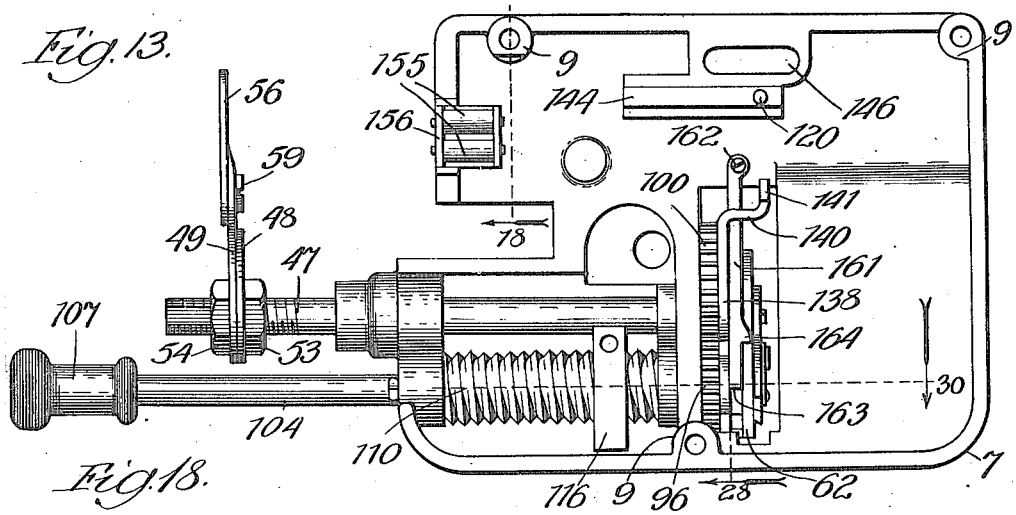
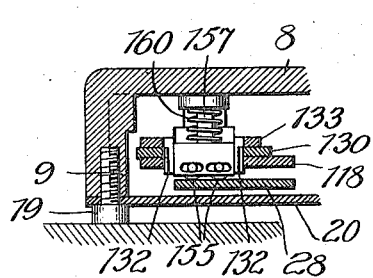
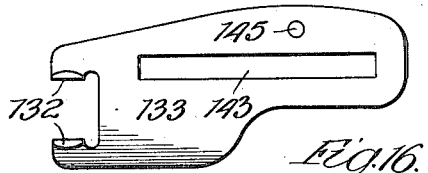
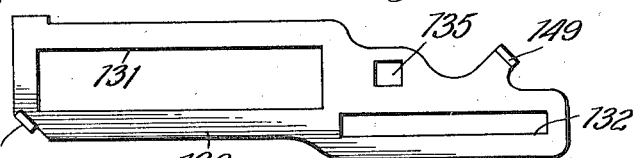
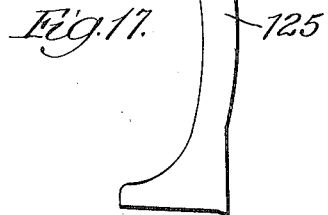
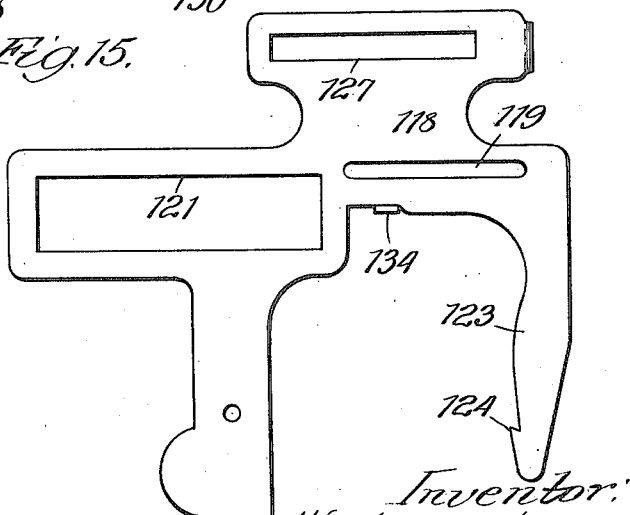
Witnesses:
Inventor:
Walter Maechler,
By David H. Fletcher
Atty.

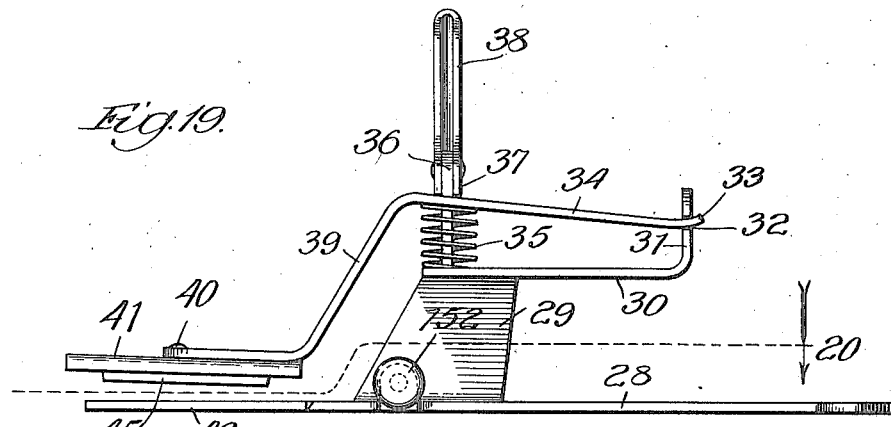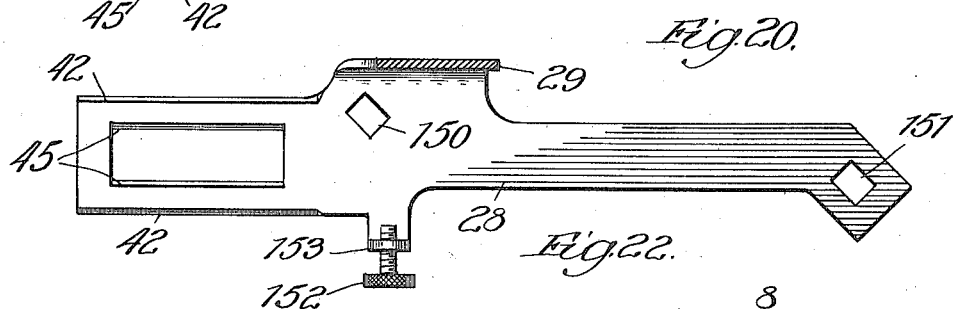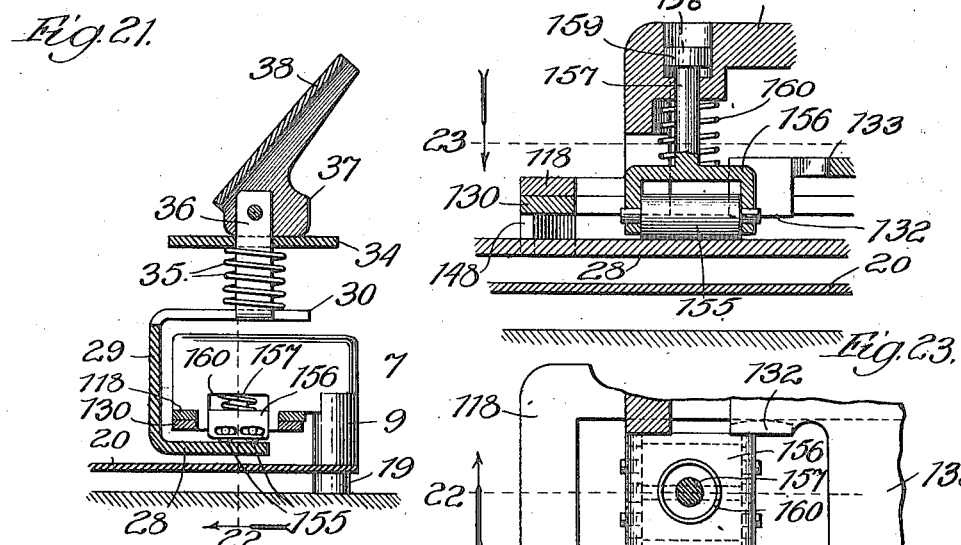

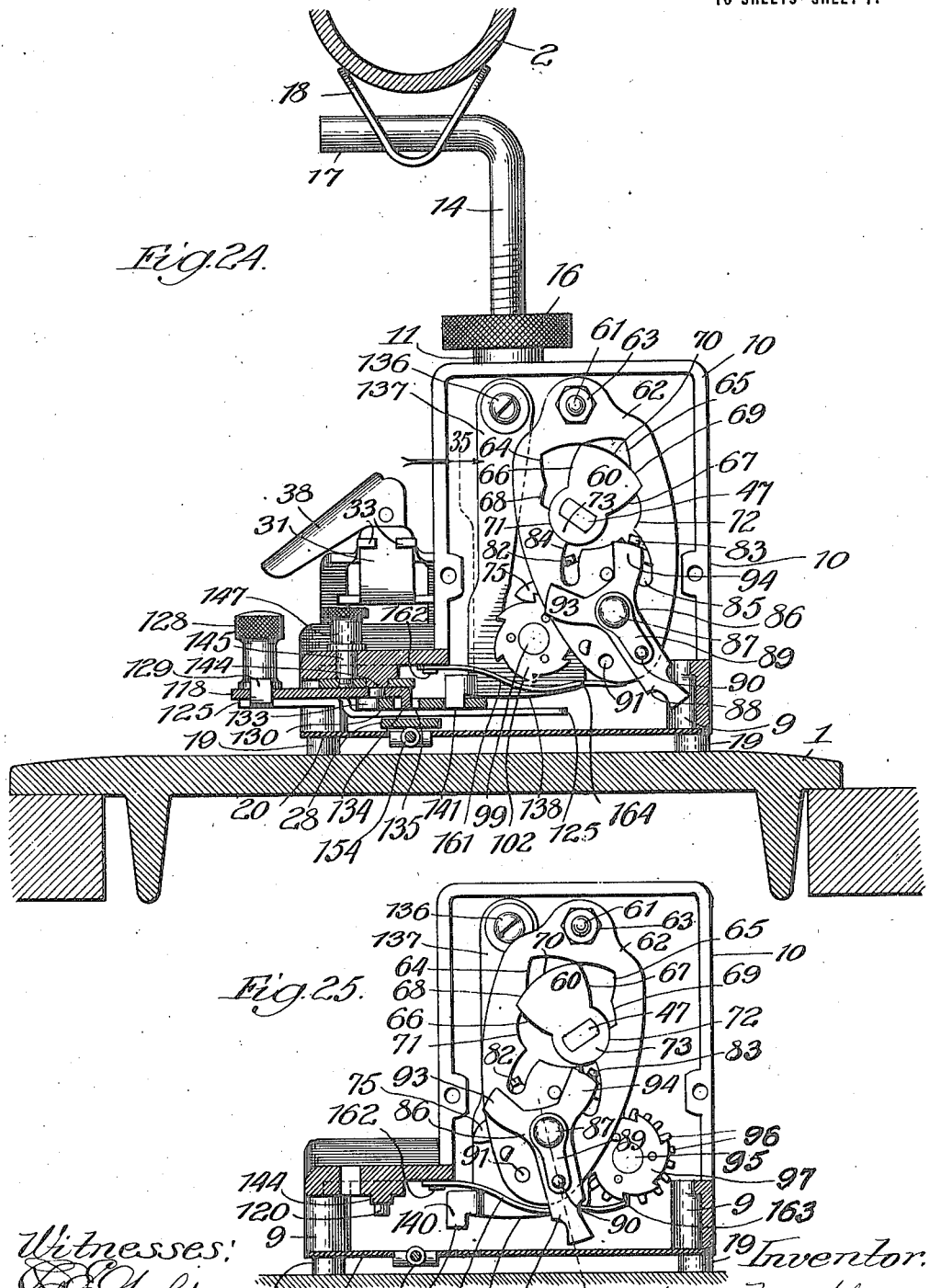

W. MAECHLER.
BUTTONHOLE ATTACHMENT FOR SEWING MACHINES.
APPLICATION FILED MAY 16, 1913.

1,157,791. Patented Oct. 26, 1915.
10 SHEETS—SHEET 8.

Witnesses:
Inventor:
Walter Maechler,
By David H. Fletcher,
Atty.

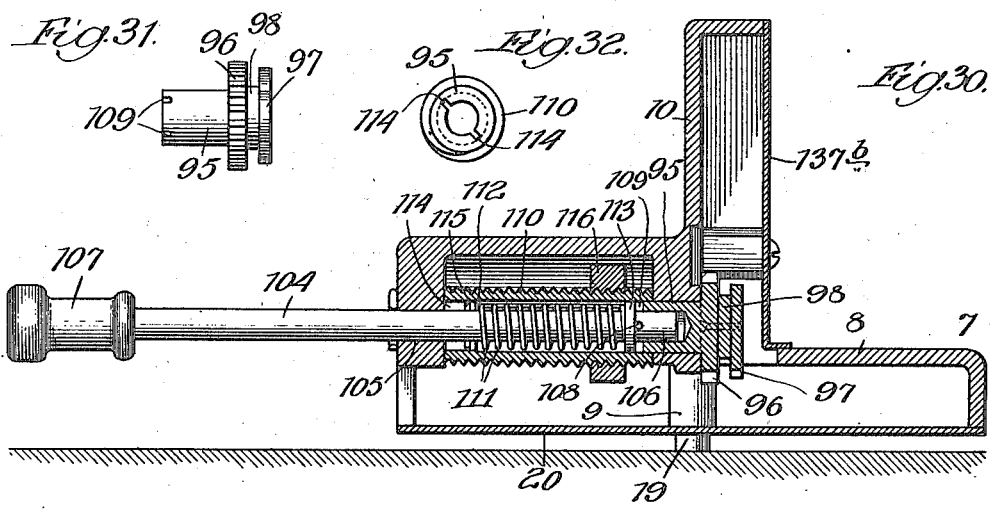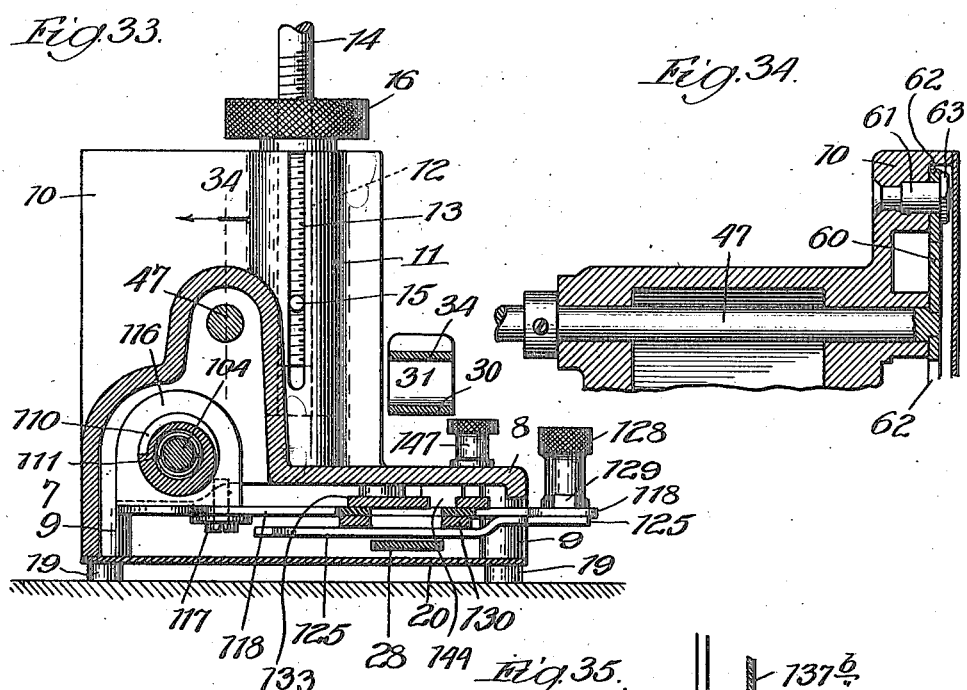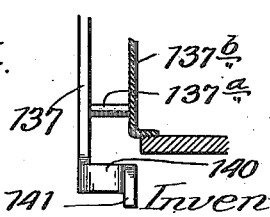

W. MAECHLER.
BUTTONHOLE ATTACHMENT FOR SEWING MACHINES.
APPLICATION FILED MAY 16, 1913.
1,157,791.
Patented Oct. 26, 1915.
10 SHEETS—SHEET 10.
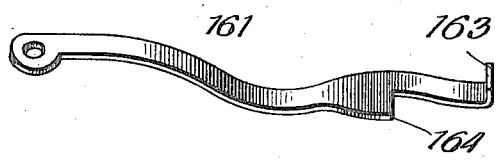
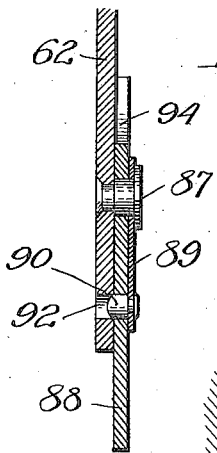
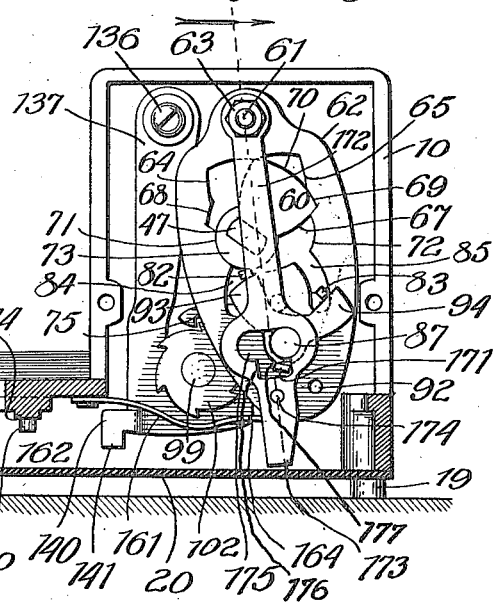
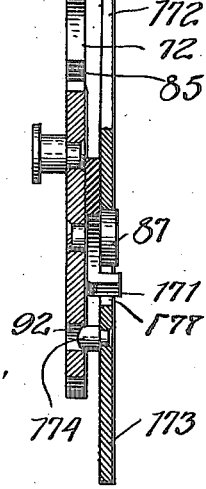
Witnesses:
Inventor:
Walter Maechler,
By David H. Fletcher,
Atty.

UNITED STATES PATENT OFFICE.

WALTER MAECHLER, OF CHICAGO, ILLINOIS, ASSIGNOR, BY MESNE ASSIGNMENTS, TO SMALLBONE MANUFACTURING COMPANY, OF CHICAGO, ILLINOIS, A CORPORATION OF ILLINOIS.

BUTTONHOLE ATTACHMENT FOR SEWING-MACHINES.

1,157,791.  Specification of Letters Patent.  Patented Oct. 26, 1915.

Application filed May 16, 1913. Serial No. 768,076.

*To all whom it may concern:*

Be it known that I, WALTER MAECHLER, a citizen of the United States, residing at Chicago, in the county of Cook and State of Illinois, have invented certain new and useful Improvements in Buttonhole Attachments for Sewing-Machines, of which the following is a description, reference being had to the accompanying drawings, forming a part of this specification, in which corresponding numerals of reference in the different figures indicate like parts.

The object of my invention, stated generally, is to provide a simple and efficient button-hole attachment for sewing-machines which shall be so constructed that it may be detachably connected with sewing-machines of various makes and may operate with equal facility with needle-bars having "short" or "long" strokes or strokes of varying length whether classified as long or short. More specific objects are as follows: To so design said machine that it may be constructed at minimum cost while insuring certainty of operation and simplicity in adaptation, adjustment and construction. To provide more simple and certain means for actuating the stitch shifting mechanism for shifting the buttonhole from one side of the needle to the other. To provide more simple and certain means for controlling the bight of the stitch. To provide simple and effective means for actuating the feeding means for regulating the length of the stitches. To provide means for preventing the overthrow of the parts driven by the action of the rock-shaft. To provide improved means for manually shifting the relative position of the work with respect to the needle without displacing the driving parts. To so construct the bottom-plate of the attachment with respect to the working parts that it may be adapted to machine bed-plates having top surfaces of varying height without in any way impairing the action of the movable parts of said attachment; all of which is hereinafter more particularly described and definitely pointed out in the claims.

Figure 11:
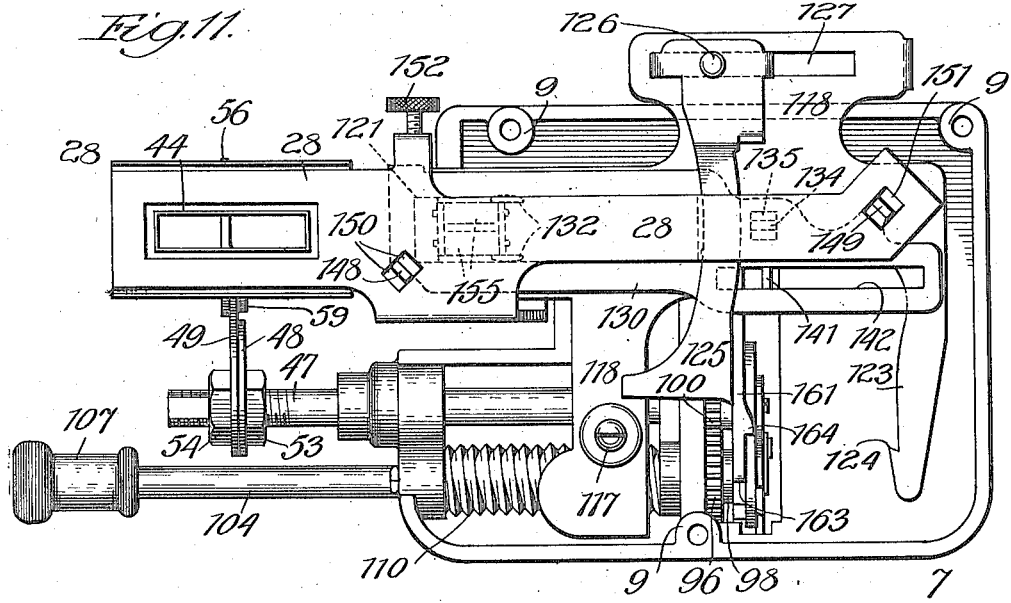
Figure 12:
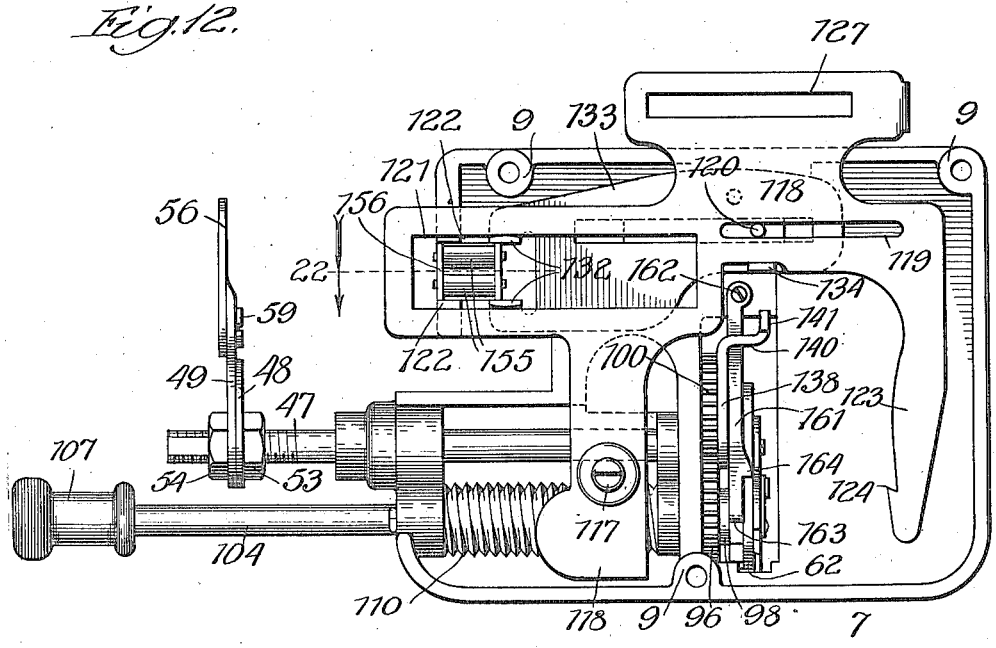
Figure 26:
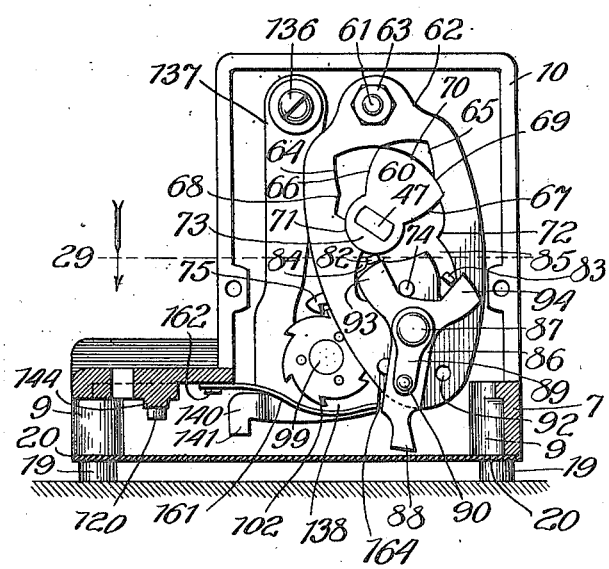
Figure 27:
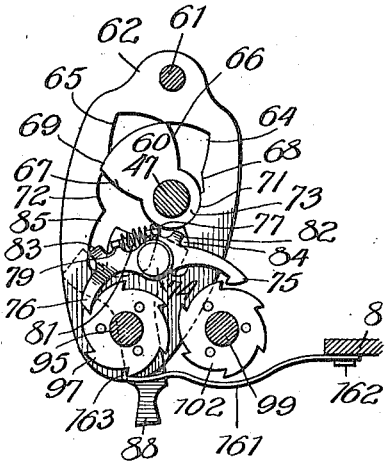
Figure 28:
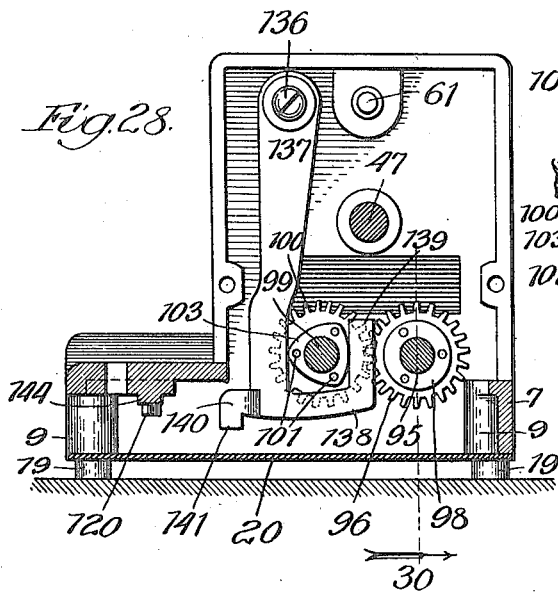
Figure 29:
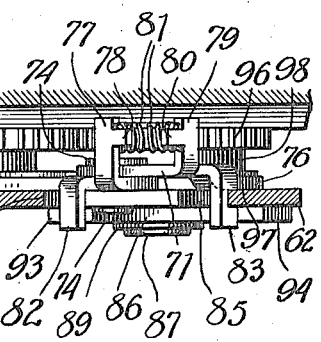

In the drawings, Figure 1 is a side elevation of a portion of a sewing-machine including the base, the head and a part of the arm, together with my improved buttonhole attachment. Fig. 2 is a plan view partly in section taken upon the line 2—2, Fig. 1. Fig. 3 is a bottom view of said attachment. Fig. 4 is an end elevation thereof as it would appear when attached to a sewing-machine, said view showing the bed-plate and a portion of the sewing-machine head. Fig. 5 is a side elevation in detail of the cloth-clamping mechanism. Fig. 6 is a plan view thereof. Fig. 7 is a transverse sectional view thereof taken upon the line 7, Fig. 6, viewed in the direction of the arrow there shown. Fig. 8 is a front face view of the actuating arm for connecting the rock-shaft to the needle-clamp. Fig. 9 is a sectional view thereof in plan taken upon the line 9—, Fig. 8. Fig. 10 is a rear face-view of said actuating arm, showing the manner of adjusting the jaws to the clamp of the needle-bar. Fig. 11 is a bottom view of the device as it would appear when the bottom-plate is removed. Fig. 12 is a like view showing the parts as they would appear with the clamping mechanism and vibratory carrying-plate removed. Fig. 13 is a like view as it would appear with other parts removed to show the feed-screw, the controlling nut thereon and actuating gear. Fig. 14 is a bottom view of the adjustable plate which serves as a guide and fulcrum for the vibratory carrier-plate. Fig. 15 is a bottom view of the sliding-plate connected with the feed screw, for actuating the vibratory carrier plate, and carrying the trip finger. Fig. 16 is a bottom view of the vibratory carrying-plate. Fig. 17 is a bottom view of the adjustable trip finger or gage for determining the length of the button-hole. Fig. 18 is a sectional view taken upon the line 18—, Fig. 13, viewed in the direction of the arrow there shown. Fig. 19 is a side view in detail of the cloth-clamping device. Fig. 20 is a plan view, partly in section, taken upon the line 20—, Fig. 19. Fig. 21 is a sectional view taken upon the line 21—, Fig. 1, viewed in the direction of the arrow there shown. Fig. 22 is a sectional view taken upon the line 22, Figs. 12, 21 and 23. Fig. 23 is a sectional view in plan taken upon the line 23—, Fig. 22. Fig. 24 is a sectional view taken upon the line 24—, Fig. 1, viewed in the direction of the arrow there shown, certain movable parts thereof being represented in extreme positions. Fig. 25 is a view of the shifting mechanism shown in Fig. 24, the movable members being shown in varied positions. Fig. 26 is a like view showing the yoke in a reversed position. Fig. 27 is a view of the reverse side of the shifting mechanism from that shown in Fig. 26. Fig. 28 is a sectional view taken upon the line 28—, Fig. 13, viewed in the direction of the arrow there shown. Fig. 29 is a sectional view taken upon the line 29—, Fig. 26. Fig. 30 is a sectional view taken upon the line 30—, Figs. 13 and 28, respectively, viewed as indicated by the arrows there shown. Fig. 31 is a side view in detail of a ratchet-wheel and gear with the short shaft upon which the same is mounted, said shaft being bored to receive the end of the shaft upon which the feed-screw is mounted. Fig. 32 is a left-hand end view of the feed-screw. Fig. 33 is a sectional view taken upon the line 33—, Fig. 2, viewed in the direction of the arrow there shown. Fig. 34 is a sectional view taken upon the line 34—, Fig. 33, viewed in the direction of the arrow there shown. Fig. 35 is a sectional view in detail, taken upon the line 35—, Fig. 24, viewed in the direction of the arrow there shown. Fig. 36 is a perspective view of the retaining or guard-spring employed to prevent an overthrow or excess movement of the ratchet-wheels. Fig. 37 is a sectional view taken upon the line 37—, Fig. 25, viewed in the direction of the arrow there shown. Fig. 38 is a face view, partly in section, taken upon the same line as Fig. 24, showing a modified form of pawl shifting lever, and Fig. 39 is an enlarged sectional view taken upon the line 39—, Fig. 38, viewed in the direction of the arrow there shown.

Referring to the drawings, 1, Figs. 1, 2 and 4, indicates the bed-plate of an ordinary sewing-machine; 2, the arm; 3, the head; 4, the needle-bar; 5, the needle, and 6, the usual needle-clamp. The body or frame of the attachment is adapted to be placed upon the bed 1, beneath the arm 2, and rigidly clamped in position, as hereinafter described. Said body consists of a cast-metal frame-member generally designated by 7, which is provided with a flat bed-plate 8, having preferably three depending studs 9, two in front and one midway between the ends at the rear. A hollow vertical frame portion or casing 10, Figs. 1, 2, 4, 24, 25, 26, 28, 30, 33, 34 and 38, is formed upon said bed-plate, preferably about midway between the ends, upon the left-hand side of which is formed a vertical semi-cylindrical portion 11, better shown in Figs. 1, 2, 24 and 33, said part being provided with a vertical bore 12, and a transverse vertical slot 13, adapted to receive a clamp-rod 14, having a cross-pin 15, Fig. 33, therein, which enters said slot to prevent said rod from being rotated within the bore. Said bore is smooth while the rod is screw-threaded and of a size to enable it to be freely moved in said bore. A thumb-nut 16 enables the rod to be adjusted vertically. The upper end portion 17 of the rod is bent horizontally as shown at 17, Figs. 1 and 24, which is passed loosely through a V-shaped sheet-metal spring-clip 18, adapted to engage the under face of the arm 2 in the manner indicated. When the attachment frame is properly adjusted with reference to the needle-bar, the thumb-nut 16 is rotated to cause the clamping-arm to rise so that the clip will be pressed firmly beneath the arm, thereby clamping the attachment in place. The clip 18 serves to prevent displacement of the clamping-rod.

Secured to the studs 9 by means of large-headed screws 19 is a bottom-plate 20. Said screw-heads form studs or supports which are adapted to rest directly upon the bed-plate 1 to support the frame of the attachment. The bottom-plate 20 is formed from sheet-steel, having a spring temper, and is provided with an extension 21, Figs. 1, 2, 3 and 4, at the left-hand end, which is made with a slight downward bend so that the end of said extension may be caused to lie normally out of the horizontal plane of the body of said plate. Lugs or feet 22 are formed upon the end of said extension, which are adapted to rest upon the raised portion of the bed-plate 23, better shown in Figs. 1, 2 and 5 of the sewing-machine, the height of which plate varies in different machines and is always less than that of the studs 19. The purpose of bending said extension downwardly is to enable it to be adapted to level bed-plates. The length of the lugs 22 should be sufficient to raise said bottom-plate extension above the teeth 24, Fig. 4, of the sewing-machine feed. A tongue 25, Fig. 3, is cut from the bottom-plate 20, to form a support in alinement with the main body of the plate, which is not distorted or affected by the bending of the extension 21. The purpose of said tongue member will be stated later. A needle-hole 26, Figs. 3, 6 and 7, is formed in said bottom-plate which is adapted to register with the needle-hole in the feed-plate of the machine when the attachment is clamped in position for use. A transverse ridge 27 is formed in said bottom-plate extension in alinement with said needle-hole, the purpose of which will be hereinafter explained.

The bottom-plate 20 serves as a primary support for a cloth-clamping mechanism which is adapted to hold and impart the proper movement to that portion of the cloth in which the button-hole is to be formed. Said cloth-clamp consists of a bottom cloth-clamp plate 28, Figs. 1, 3, 4, 5, 7, 19, 20, 21 and 22. Formed at one side of said bottom clamp-plate is an upwardly bent portion 29, of a height greater than the thickness of the bed or frame-portion 8 of the attachment, which serves as a support for a horizontal member 30, which in turn is provided with an upwardly bent portion 31, at its right-hand end, having notches 32 adapted to engage and form bearings for lugs 33, upon the end of a clamp-lever 34, held normally in a raised position by means of a spring 35, interposed between it and the part 30. A stud 36 is rigidly attached to the part 30 and extended upwardly through an opening in part 34, said stud having pivoted upon its upper end an eccentric 37, having an operating arm 38. That portion of the lever arm 34 at the left of the eccentric, is bifurcated so as to provide downwardly bent arms 39, 39, Figs. 1, 2, 4, 5, 6 and 19, the ends of which are attached at 40 to an upper cloth-clamping plate generally designated by 41.

The left-hand end of the clamp-plate 28 is beveled upon its edges as shown at 42, Figs. 4, 7, 19 and 20, and the cam-plate 41 is provided with side flanges 43 adapted to conform thereto. A rectangular elongated opening 44, Figs. 11 and 20, is formed in the lower clamp-plate 28, the sides of which opening are also beveled, into which opening counterpart flanges 45, upon the clamp-plate 41, are extended, as more clearly shown in Fig. 7. Upon placing the fabric 46 over the under clamping-plate and moving the arm 38 downwardly to press the two clamping-plates together as shown in Figs. 4 to 7, inclusive, the cloth is firmly held in place ready for the stitching operation. In order to accomplish this, it is essential that the cloth-clamp should be given a rectangular four motion movement and that means should be provided for varying the length of the button-hole at will.

I will now describe the means for imparting the requisite movement to the plate 28 for sewing around the button-hole as well as that for controlling the length of the stitch and the bight. The needle-bar 4 constitutes the primary source of power and hence the connecting means from that to the movable cloth-clamp will be traced in successive order.

Mounted in suitable bearings in the frame 7 is a horizontal rocker-shaft 47, Figs. 1, 2, 3, 4, 11, 12, 13, 24, 25, 26, 27, 28, 33 and 34, the projecting end of which is flattened as shown and has fitted thereon, so as to be rigid therewith, a short arm 48, by the side of which is placed a longer arm 49, see Figs. 8, 9 and 10, which is provided with a round opening to enable it to be adjusted to any desired position upon the shaft with respect to its fellow. A pin 50, Fig. 10, in the end of the arm 48, is adapted to enter either one of two bores 51, 52, Figs. 8 and 10, in the arm 49, and when adjusted the two are locked together by means of nuts 53, 54, upon the shaft 47. The arm 49 is provided with jaws 55, 56, the faces of which are parallel and adapted to engage the clamp-screw 6 of the needle-bar. Said arm 49 is provided with a slot 57, Figs. 9 and 10, into which is fitted a rectangular indented portion 58, of the jaw 56. This construction enables the distance between the two jaws to be accurately adjusted to fit varying sized clamps upon the needle-bar, and when so adjusted they may be secured in place by means of a screw 59. The purpose of the adjustment of the pin 50 in the holes 51 or 52 is to enable the arm to be adapted to sewing-machines having either a "long" or "short" needle-bar stroke. By means of the nuts 53 and 54, the arms 48 and 49, may be adjusted laterally to conform to the position of the needle-bar clamp.

The opposite end of the rock shaft from that upon which the actuating arm is secured is arranged to enter the casing 10, Figs. 24, 25, 26, 27, 28 and 34. Said end is squared or flattened, as shown, and is rigidly fitted into a corresponding opening in a cam-like arm or rocking member 60. Pivoted at its upper end upon a stud 61 in the casing 10 above the shaft 47, is an oscillatory-plate or member 62, Figs. 24, 25, 26, 27 and 29. Said plate, which is held in place by means of a nut 63, is, in the example shown, in the same plane with the rocking-member 60, by which it is adapted to be actuated, an opening of special contour being formed in said plate to conform to the contour and movements of said rocking-member. Upon opposite sides of said opening are bearing-surfaces 64 and 65, which are adapted to be alternately engaged by bearing surfaces 66, 67, upon the cam, in the manner indicated in Figs. 24 to 27, inclusive. The length of each of the surfaces 64 and 65 is such that when the shaft 47 is rocked to a predetermined degree less than its full stroke, the maximum lateral movement will have been imparted by the part 60 to the plate 62, in whichever direction it is moved; and in order to provide for a further movement of the part 60 in the same direction without moving said plate, and while still holding it in a stationary position, the continuations of the bearing surfaces are given different curves, as shown at 68 and 69, to accurately fit the end curve 70 of the cam 60, which describes an arc struck from the center of the shaft 47. It will thus be seen that any movement of the cam 60, after passing the lower end of the surface 64 or 65, will not only fail to impart further movement to said plate but will serve to positively lock it against backward movement. Curved surfaces 71, 72 are also formed in said plate 62, below the curves 68, 69, to fit the curve of the hub 73, of said cam, so that when the end of the cam is moved in either direction to a locking position, one of the surfaces represented by the curves 71, 72 will contact with the hub upon the opposite side from that toward which the cam is directed and the plate 62 will be stationarily locked until the cam 60 is reversed. The primary purpose of the oscillatory plate 62 is to carry and control actuating pawls to impart a step-by-step movement through ratchet-wheels and gears, to a feed-screw for regulating the length of the stitches and also to supplemental mechanism for controlling the bight.

Pivotally mounted upon a wrist-pin 74, better shown in Figs. 27 and 29, upon the back of the plate 62, are pawls 75, 76, which are arranged to extend in opposite directions and to act independently of each other. The pawl 75 is provided with a laterally extended arm 77, having a lug 78 thereon, while the pawl 76 is provided with a like arm 79, having a like lug 80, the two lugs being extended toward each other to form supports for opposite ends of a coiled spring 81, which is interposed between said arms for the purpose of yieldingly holding said pawls in their respective normal positions. Lugs 82, 83, upon said respective pawls, are extended in opposite directions from those of the arms 77 and 79 and caused to project through curved slots 84, 85, respectively, in the plate 62, the lower ends of said slots serving to limit the downward movement of said lugs and hence of said pawls.

A shiftable or tilting-yoke, generally designated by 86, is pivotally mounted upon a stud 87, upon the outer face of the oscillatory-plate 62. Said yoke is provided with a depending arm 88, which is arranged to extend below the lower end of the plate 62, nearly to the bottom-plate 20. A locking-spring 89 is held against the arm 88 by the head of the stud or screw 87, and is provided with a pin 90, which is projected loosely through the arm 88, so as to engage with one or the other of two holes 91, 92, in the plate 62, for the purpose of yieldingly locking said arm in one of two extreme positions. Said yoke is formed from sheet-metal and is provided with laterally extended curved arms 93, 94, the ends of which represent arcs struck from the center of the axis of said yoke. Said arms are adapted to engage one or the other of the lugs 82, 83, according to the relative position of the yoke, and to thereby hold the pawl with which it is connected out of engagement with the ratchet-wheel, hereinafter referred to, with which it is adapted to coact, until the other pawl is released, thereby preventing conflict in the action of the pawls.

I will now describe the ratchet-wheels and gears for actuating the feed-screw and their relation to the latter. Journaled in a horizontal bearing in the frame is a short shaft 95, Figs. 25, 27, 28, 30, 31 and 32, of which a portion is hollow. Said shaft has rigidly mounted thereon a gear-wheel 96 and a ratchet-wheel 97, between which is interposed a washer 98 for spacing said wheels apart. Rotatably mounted upon a wrist-pin 99, which is secured within the casing 10, adjacent to the shaft 95, is a gear-wheel 100, arranged to mesh with the gear-wheel 96, Figs. 11, 12, 13, 28 and 29. Said gear 100 is rigidly connected by means of pins 101, Fig. 28, with a ratchet wheel 102, Figs. 24, 26, 27 and 29, there being interposed between said gear and ratchet-wheel a substantially triangular shaped cam 103. The ratchet-wheels, like the gears, are in a common plane in position to be alternately actuated by the pawls 75, 76, the gear 100, cam 103 and ratchet-wheel 102 moving in unison. The cam 103 represents three equal working curves which are concentric with the axis of the shaft, while each of said ratchet-wheels is provided with six teeth. It follows, therefore, that with each alternate vibration of the rock-shaft there will be one cam movement, and that both gears and ratchet wheels will rotate in unison but in opposite directions. The purpose of the cam is to control the bight, and its operation will be explained in connection with the coacting parts after describing the feed-mechanism.

A shaft 104, Figs. 1, 2, 3, 11, 12, 13, 30 and 33, has one bearing journaled in the frame as clearly shown at 105, Fig. 30; while one end is inserted, as shown at 106, in said figure, in an axial bore in the short shaft 95. Said shaft 104 protrudes from the frame toward the left to a considerable extent and is provided with a knob 107 for manual manipulation. A pin 108 is extended diametrically through the shaft 104, and the ends thereof caused to project so as to enter and engage end-notches 109 in the shaft 95, to enable the shaft 104, when in a normal position, to be rotated by the shaft 95.

Mounted upon the shaft 104 is a feed-screw 110, also shown in Figs. 11, 12 and 13, having a longitudinal bore throughout the greater portion of its length of greater diameter than that of the shaft. Encircling said shaft within said bore is a coiled spring 111, one end of which bears against a shoulder 112, Fig. 30, formed by reducing the bore at the left-hand end of the screw to fit the shaft 104. The opposite end of the spring is arranged to bear against a washer 113, which is held in place by the pin 108. The diameter of the large bore in the screw is such as to receive the end of the shaft 95, so as to center said screw which is held against endwise movement by the end walls of the casing. Formed in the reduced portion of the bore at the left-hand end of the screw are radial grooves 114, Figs. 30 and 32, which are adapted to receive the projecting ends of a pin 115, in the shaft 104, the purpose of which is to cause the rotation of the screw, either through the action of the shaft 95, or by manipulation of the shaft 104, when disengaged from the shaft 95, for the purpose hereinafter stated.

A traveling nut 116 is mounted upon the feed-screw and connected by means of a screw 117 to a sliding plate 118, Figs. 11, 12, 13, 15. Said plate is adapted to be moved longitudinally of the frame and is provided with a narrow guide-slot 119 adapted to receive a guide-pin 120. A wide longitudinal slot 121 is formed in the plate 118, into which guide-lugs 122, 122, Fig. 12, formed upon said frame, are extended, the lower ends of said guide-lugs being flush with the lower face of the sliding plate. A trip-finger 123, having a tooth 124, is formed upon the plate 118, said tooth being adapted at a predetermined time to engage the lower end of the arm 88, Fig. 26, of the tilting-yoke. An adjustable trip-finger 125, Figs. 1, 2, 3, 11, 17 and 33, is clamped to the sliding-plate in the following manner. A screw-threaded stud 126 is projected upwardly through a slot 127, and secured in place by means of a thumb-nut 128. Lugs 129, 129, formed upon the trip-finger, are projected upwardly and serve not only to secure the finger in proper alinement but as a gage for the purpose hereinafter stated.

A vibratory carrying-plate, generally designated by 130, is placed immediately below said sliding-plate between that and the trip-finger 125, Figs. 11, 16, 18, 21, 22. Said plate is provided with a wide longitudinal slot 131, which is adapted to straddle, so that its opposite edges may bear against the outer surfaces respectively of two lugs 132, 132, formed upon a plate 133, shown in Fig. 14, as well as in those last mentioned. The outer faces of the lugs 132 are rounded and serve to fulcrum the plate 130 thereon. Said plate is intended to have a lateral vibratory movement and a longitudinal movement as well; one controlling the bight and the other the feed for the stitches. The longitudinal movement is imparted by means of the sliding plate 118, upon which is formed a depending lug 134, Figs. 11, 12, 15 and 24, and is loosely projected into a rectangular slot or opening 135, better shown in Figs. 16 and 24. Said slot conforms in length to that of the lug but is about three times as wide, as shown in Fig. 24 and indicated in dotted lines in Fig. 11, thereby leaving the plate 130 free to be vibrated laterally.

The means for causing said vibration will now be described. Pivoted in the upper part of the casing 10, upon a stud 136, Figs. 24, 25, 26 and 28, is a vertical lever 137, the lower portion of which extends into the space between the gear-wheel 100 and the ratchet-wheel 102, so that one edge is caused to bear against the cam 103. Said lever is provided at its lower end with a laterally extended arm 138, upon the end of which is an upwardly extended portion 139, the inner edge of which is parallel to that of the main body and is arranged to bear upon the opposite side therefrom, of the cam 103, so that a rotation of the cam will cause said lever to vibrate. A stud 137$^a$, upon a plate 137$^b$, Fig. 35, is adapted to bear against the lever 137 to steady its movement. A bent arm 140, upon said lever, also shown in Figs. 12 and 13, is provided with a depending lug 141, likewise shown in Fig. 11, which lug is in engagement with a longitudinal slot 142, formed in said vibratory plate. As the right hand end of the plate 130 is vibrated by the lever 137, said plate has imparted thereto a pivoted movement upon the fulcrum lugs 132, the length of throw of the left-hand end of the plate being governed by the relative position of said lugs, for the adjustment of which the following means is provided.

A slot 143, Fig. 14, is entered by a stationary guide-member 144, Figs. 13 and 24, formed in the frame. A screw-threaded stud 145 is arranged to extend upwardly through a slot 146 in the frame plate, and is locked in place by means of a thumb-nut 147, shown also in Figs. 1 and 2. Said thumb-nut enables the plate 133 to be moved longitudinally to vary the throw of said vibratory plate. The plate 130 is utilized as an intermediate member to control the feed as well as the lateral vibration of the bottom cloth-clamp plate 28.

Diagonally disposed depending lugs 148, 149, Figs. 1, 11 and 16, are formed upon the vibratory-plate 130, which are adapted to enter diagonally disposed slots 150, 151, respectively, in the lower cloth-clamp plate 28, in the manner more clearly shown in Fig. 11. The horizontal length of the lugs corresponds to the width of the slots; but the width of the former is enough less than the length of said slots to provide for the desired maximum movement of said clamp-plate when shifted laterally from one to the other side of a button-hole. Should it be found expedient to limit the extent of said lateral movement, it may be accomplished by means of a set-screw 152, Figs. 1, 2, 3, 4, 5, 11, 19 and 20, tapped into an upwardly projecting lug 153 formed upon said lower clamping plate and so disposed that the end of the screw may press against the edge of the vibratory carrying plate.

It is desirable that friction should be avoided as much as possible in the lateral movement of the clamp-plate, and in order to accomplish this a friction roller 154, Figs. 130

1, 3 and 24, is journaled in suitable bearings in the bottom-plate 20, upon which roller the bottom of said clamping-plate is adapted to bear, while rollers 155, 155, are journaled on bearings in a yoke 156, having a vertical stem 157, arranged to extend into a base in the frame-plate 8. An enlarged bore 158, Fig. 22, in said frame-plate, is adapted to receive a head 159, intended to limit the downward movement of said stem. A coiled spring 160 acts to press the friction rollers against the top of the clamp-plate 28. The purpose of the tongue 25, Fig. 3, is to prevent any possible excess of friction upon the clamping-plate resulting from a distortion of the end portion 21 of the bottom-plate, which may be caused to bend more or less when clamped in place upon a sewing-machine owing to the varying height of the bed-plate 23, Fig. 1. While said part 21 may be free to bend out of the plane of the body of the plate 20, the tongue 25, which is immediately below the cloth-clamping plate, remains unchanged.

Before explaining the operation of the machine, I will describe the means for preventing a possible overthrow of the ratchet-wheels 102 and 97. The pawl 75, Figs. 26 and 27, is so formed and adjusted with reference to the arm 93 of the tilting-yoke, that when the pawl 76 is released and free to actuate the ratchet-wheel 97, the pawl 75 will, when the plate 62 shall have reached the limit of its movement to the right, fall into position behind, but out of contact with, a tooth of the ratchet-wheel 102, which is caused to rotate toward the tooth of the pawl 75, which latter acts as a stop to prevent an excess movement of the wheel. Such an adjustment, however, cannot be utilized with the pawl 76, which differs from its fellow and hence other means must be employed. For this purpose a curved spring 161, Figs. 11, 12, 24, 25, 26, 27, 36 and 38, has one end attached at 162 to the bottom of the bed-plate. The body of said spring lies in the vertical plane of said ratchet-wheels and is provided with a tooth 163, upon the end thereof, which is adapted to move into the path of the teeth of the ratchet-wheel 97, when the plate 62 shall have reached its limit of movement in either direction. Inasmuch, however, as both ratchet-wheels are actuated simultaneously by reason of the intermeshing of the gears 100 and 96, it follows that the tooth 163 should be withdrawn at the beginning of each positive movement imparted to the ratchet-wheels whichever pawl is in action. For this purpose a laterally extended lug or projection 164 is formed upon said spring so as to project into the path of movement of the lower end of the oscillatory plate 62, said spring being so disposed with reference to said plate that the tooth 163 will be in a locking position when the plate 62 is in either extreme position; but when said plate is vibrated its lower end will contact with the part 164 and depress the spring and withdraw the tooth 163 from an engaging position. As before stated, the trip-finger 125 is intended to control the length of travel in one direction of the sliding plate so as to fix the length of the button-hole. The adjustment of said trip-finger may be determined by the diameter of the button to be used. An upturned lug 165, Figs. 1, 2 and 3, is formed upon the plate 118, against which the gage-button is placed. The thumb-nut 128, being loosened, is pushed laterally toward said lug until the lug 129 is brought into contact with the button, when the thumb-nut may be tightened, thereby completing the adjustment. The cloth being secured between the clamping-plates, the machine is ready for use.

Applicant makes no claim to a feed-screw in combination with a sliding-plate, a vibratory carrier and cloth-clamping mechanism; nor to those features in combination with an adjustable trip-mechanism for initiating the reversal of the feed-screw; nor to a rock-shaft connected with a needle-bar for driving intermediate mechanism to actuate said parts; all of which elements are old substantially in the relations shown by him; but the novel features of his invention lie more especially in the means for enabling the device to be adapted to sewing machines having "long" and "short" strokes, to the means interposed between the rock-shaft and feed-screw whereby the variations in stroke, whether long or short, of machines of different make may be provided for while still maintaining accuracy and certainty of movement in the controlling parts; in the reversing means employed in conjunction with the trip-fingers and as a part of said interposed means for reversing the movement of said screw; the means for manually actuating the feed-screw to secure desired adjustments without disconnecting the screw-reversing gears, and the means employed for enabling a portion of the bottom-plate to be adjusted to bed-plates of varying height without impairing the free action of the cloth-clamping plate.

The operation of the machine is as follows: If it is to be used with a "long-stroke" needle bar, the pin 50, Fig. 10, is adjusted in the hole 52, of the arm 49, which serves to impart the proper movement to the rock-shaft. If for a "short-stroke" needle-bar, it should be placed in the hole 51. With each downward stroke of the needle-bar, the rocking member 60, Fig. 25, is moved to the left against the bearing surface 64 of the oscillatory plate 62, until it reaches the point of intersection of the curves 64 and 68, at which point the plate 62 will have reached its full limit of oscillation, being locked against further movement by the surface 72 being brought into contact with the hub 73, upon said rocking-member, but, in view of the excessive stroke of the needle-bar, it is obvious that provision should be made for a further movement of the rocking member, which is accomplished by the curve 68. As long as the curve 70 of the rocking-member is in contact with any part of the curve 68, the plate 62 will be positively locked against movement in either direction, whether the rocking-member be moved or not. It will be seen, therefore, that the length of the curve 68 constitutes the measure of variation in the extent of movement described by the rocking-member and hence of the needle-bar. Assuming the tilting-yoke to be in the position shown in Fig. 25, the pawl 76 will be locked in a non-engaging position while the pawl 75 will be free to engage the teeth of the ratchet-wheel 102. The upward stroke of the needle-bar causes the rocking member to be reversed, when the ratchet-wheel 102 will be moved one step toward the right, which, through the combined action of the gears 100 and 96, will cause the shaft 95 and feed-screw 110 to be rotated one step toward the left, thereby serving, through nut 116 and sliding-plate 118, to longitudinally move the vibratory carrier-plate 130, and, through it, the underclamping-plate 28, thereby providing for the length of a stitch. At the same time the lever 137 is actuated by the cam 103, which causes the right-hand end of the plate 130 to be vibrated, one or the other of the lugs 132 serving as a fulcrum. This movement being imparted to the clamping-plate, provides for the "bight," the length of which may be varied by moving the plate 133 to the right or left to increase or decrease the throw of the vibratory plate. The extent of longitudinal movement of the clamping-plate, and hence the length of the button-hole, is dependent upon the relative positions of the trip-fingers 124 and 125 with respect to each other and to that of the yoke 86. It should be kept in mind that said yoke is adapted to be yieldingly held by the pin 90 in one of two extreme positions with respect to the vibratory member 62, which, with each movement of the rock-shaft 47, is vibrated in a path at right angles to the planes of movement of said trip-fingers. Said fingers respectively, are located at predetermined distances upon opposite sides of a line which may be said to be parallel to the respective paths of movement of said trip-fingers, so that the plate 118 is moved in a given direction by the screw 110, until one of said trip-fingers is brought into the path of movement of the yoke, the part 88, of said yoke is caused to engage with said trip, thereby arresting its movement, while the lower end of the part 62 continues to swing to its full limit, said part being so adjusted as to cause the yoke 86 to be shifted so that the locking-pin 90 will be transferred from one of the holes 91, 92, to the other, according to the trip-finger which the yoke has been engaged. If, for example, the plate 118, is being moved from left to right, when the finger 125 is moved into the path of the yoke, it engages said yoke and shifts the same to the position shown in Fig. 25, thereby releasing the ratchet tooth 75, Fig. 27, and engaging the ratchet tooth 76 with the ratchet 97, thus shifting the direction of movement of the screw 110. Said screw movement is then continued in the new or reversed direction until the trip 124, is brought into the path of movement of the yoke, which is engaged thereby and moved to the position shown in Fig. 26. The period between the reversals is governed by the relative adjustment of the trips with respect to each other, which adjustment is controlled by the adjusting nut 128, said adjustment in turn determining the length of the buttonhole. Should it become desirable to adjust or readjust the work with respect to the position of the needle, it may be done by pulling the knob 107 toward the left, which causes the pin 108, Fig. 30, to be disconnected from the shaft 95, when, by rotating the knob, the screw may be turned in either direction. The friction of the cloth, which is held by spring pressure against the rib 27, Figs. 1 and 3, on the bottom-plate, tends to prevent a longitudinal movement of the bottom clamping-plate. When the carrier-plate starts to move, after each reversal of the screw, the tendency is to move the lower clamping-plate with it; but at this instant, the lugs 148 and 149 are bearing against the edges of the diagonal slots 150 and 151, Fig. 1, which causes the plate 28, first to be shifted laterally to its full limit before any longitudinal movement can be imparted to it. This reversing action occurs with each reversal of the feed-screw.

From what has been stated, it will be seen that a four-motion rectilinear movement is imparted to the cloth-clamp for working the ends and sides of the button-holes, it being assumed that in starting the work the shaft 104 will be manipulated to secure the proper adjustment.

The machine may be utilized as an entirety in conjunction with a needle-bar and shuttle and their coacting parts without departing from the principles involved in the invention; but I prefer to use it as an attachment for an ordinary sewing-machine, in which case I prefer to provide a detachable tension to be used with that of the ordinary machine, by which means the tension device for ordinary work need not be changed.

In Fig. 1 I have shown a tension device 166, upon a vertical support 167, which is, with a horizontal plate 168, adapted to lie upon the arm 2, lugs 169 being formed upon opposite sides for engaging the arm to prevent lateral displacement. Said plate is provided with a perforation to receive the spool-stud 170 and when used is placed beneath the spool.

In Figs. 38 and 39 I have shown modified means for tilting the pawl-shifting yoke. Said yoke is provided with the diverging arms 93 and 94, corresponding to the original construction; but in lieu of the arm 88 a short projecting lug 171 is formed thereon. A swinging finger 172 has its upper end pivoted to the stud 61, while its lower end 173 takes the place of the arm 88 and is adapted to be engaged by the trip-fingers. Said swinging finger constitutes a spring whereby its lower end is normally held in contact with the plate 62. A pin 174 is adapted to enter the holes 91, 92 to yieldingly hold said finger in one or the other of two extreme positions. The head of the stud 87, entering a slot 175, serves as a stop to limit the lateral movement of said finger with respect to the plate 62. Shoulders 176, 177, are adapted to engage the lug 171 and shift the yoke when the part 173 is brought into engagement with a tripfinger in the manner above described with reference to the yoke 86.

Having thus described my invention, I claim:—

1. In a button-hole attachment for sewing-machines, the combination with a rock-shaft adapted to be operatively connected with a needle-bar, a rocking-member upon said shaft for engaging an oscillatory-member to impart a step-by-step movement to feeding means, said oscillatory member having bearing surfaces formed to be successively engaged by said rocking-member during a single movement of the latter in one direction, one bearing-surface for causing a maximum lateral movement of said oscillatory-member as a result of a partial predetermined movement of said rocking-member and the other for permitting an indefinite continuation of the movement of said rocking-member while temporarily locking said oscillatory-member against reversal, feeding means actuated by said oscillatory-member, and a cloth-clamp in operative connection with said feeding means.

2. In a button-hole attachment for sewing-machines, the combination with a rock-shaft adapted to be operatively connected with a needle-bar, a rocking-member upon said shaft for engaging an oscillatory-member to impart a step-by-step movement to feeding means, said member having bearing-surfaces formed to be successively engaged by said rocking-member during a single movement of the latter in one direction, one surface for causing a maximum lateral movement of said oscillatory-member as a result of a partial movement of said rocking-member, the other for permitting an indefinite continuation of the movement of said rocking-member while temporarily locking said oscillatory member against reversal, means for positively limiting the lateral movement of said oscillatory member to a given maximum, cloth-clamp feeding means actuated by said oscillatory-member and a cloth-clamp in operative connection with said feeding-means.

3. In a button-hole attachment for sewing-machines, the combination of a rock-shaft, means for connecting the same with a needle-bar, a rocking member upon said shaft, a pivoted oscillatory-member arranged to be actuated by said rocking-member for imparting a step-by-step movement to feeding means, said oscillatory-member having bearing surfaces to be successively engaged by said rocking-member, whereby the latter in a predetermined part of its movement in one direction may serve to move said oscillatory member to a maximum degree and to lock the same against return while continuing its movement indefinitely, feeding means actuated by said oscillatory-member and a cloth-clamp in operative connection with said feeding means.

4. In a button-hole attachment for sewing-machines, the combination with a cloth-clamp and feeding-means, of a rock-shaft and means for actuating the same, a rocking-cam mounted upon said shaft, a pivoted oscillatory-plate located in the path of said rocking-cam to be oscillated thereby, and intermediate means actuated by said plate and operatively connected with said feeding means.

5. In a button-hole attachment for sewing-machines, the combination with a cloth-clamp, feeding and guiding means for feeding and guiding said clamp in a path conformatory to the outline of a button-hole, a rock-shaft, a rocking-member mounted thereon, an oscillatory-member in the path of said rocking-member, said oscillatory member having two pairs of curved bearing surfaces, said pairs being disposed upon opposite sides of a central longitudinal line in the plane of its axis, said rocking-member when brought into contact with one surface serving to move said oscillatory-member laterally in a given arc to a predetermined extent and when continued in its movement into contact with said second surface to lock the same in a stationary position, and means for connecting said oscillatory member with said feeding means.

6. In a button-hole attachment for sewing-machines, the combination with a cloth-clamp and feeding means, of a rock-shaft, means for actuating the same, a rocking-member mounted thereon, an oscillatory-plate located in the path of said rocking-member, said plate being formed to swing laterally in the arc of a circle in each direction means thereon for engaging said rocking member to lock said plate against movement in either direction while said rocking member continues its movement indefinitely and then reverses, and means actuated by said plate for actuating said feeding means.

7. In a button-hole attachment for sewing-machines, the combination with a cloth-clamp and feeding means for actuating the same, of a rock-shaft, means for actuating the same, a rocking-member mounted thereon, an oscillatory plate located in the path of said rocking-member, said plate being pivoted at one end to enable its free end to swing a definite distance laterally in each direction means upon said plate for engaging said rocking member to lock said plate against movement in either direction while said rocking-member continues its movement indefinitely to the end of its stroke and then returns, means actuated by said plate for actuating said feeding means, tripping-means and means carried by said oscillatory-plate for engaging said tripping-means to reverse the direction of movement of said feeding means.

8. In a button-hole attachment for sewing-machines, the combination with a cloth-clamp and feeding means for actuating the same, of a rock-shaft, means for connecting the same with a needle-bar, a rocking-member upon said shaft, an oscillatory-member located in the path of said rocking member to be actuated thereby, said oscillatory-member being formed to be moved a definite distance laterally in each direction and there locked while said rocking-member continues its movement indefinitely to the end of its stroke and is reversed, tripping means actuated by said feeding means for determining the length of a button-hole, and a tilting-yoke mounted upon said oscillatory member in position to be engaged and reversed by said tripping means to reverse the direction of movement of said feeding means.

9. In a button-hole attachment for sewing-machines, the combination of a rock-shaft, a rocking member mounted thereon, an oscillatory-member in position to be actuated by said rocking-member, said oscillatory member being formed to be moved a definite distance laterally in each direction and there locked while said rocking-member continues its movement indefinitely, pawls mounted upon said oscillatory member, ratchet wheels in position to be engaged by said pawls respectively, a gear-wheel upon the axis of each ratchet-wheel and rigidly connected therewith, said gear-wheels being arranged to intermesh, a tilting-yoke for holding one of said pawls out of engagement with its ratchet-wheel while the other is free to act, a feed-screw in operative connection with said gears, trip-fingers arranged to be alternately moved by the action of said feed-screw into the path of said yoke to engage and trip the same in opposite directions, cloth-clamping means, and means for operatively connecting the same with said feed-screw.

10. In a button-hole attachment for sewing-machines, the combination with a cloth-clamp and feed-mechanism of a feed-screw for actuating said feeding mechanism, a rock-shaft, an oscillatory member actuated by said rock-shaft, intermeshing gears in operative connection with said feed-screw, a ratchet-wheel positively connected with each of said gears, independent pawls mounted upon said oscillatory-member, one for each of said ratchet-wheels, a tilting-yoke upon said oscillatory member for alternately holding one or the other of said pawls out of engagement, and tripping means actuated by said feed-screw for alternately engaging said yoke from opposite directions to tilt the same, shift said pawls and reverse the direction of movement of said feed-screw.

11. In a button-hole attachment for sewing-machines, the combination of a feed-actuating mechanism in which is combined a feed-screw, intermeshing gears mounted upon different axes for actuating said feed-screw, a ratchet-wheel connected with each gear, a rock-shaft, means for actuating the same, a rocking-member upon said shaft, an oscillatory-member actuated by said rocking-member, independent pawls carried by said oscillatory-member for engaging said respective ratchet-wheels, means for holding one of said pawls out of engagement while the other is in action, and means for preventing an excessive movement of said ratchet-wheels.

12. In a button-hole attachment for sewing-machines, the combination of a feed-actuating mechanism in which is combined a feed-screw, intermeshing gears mounted upon different axes for actuating said feed-screw, a ratchet-wheel connected with each gear, a rock-shaft, means for actuating the same, a rocking-member upon said shaft, an oscillatory member actuated by said rocking member, independent pawls carried by said oscillatory member for engaging said respective ratchet-wheels, means for holding one of said pawls out of engagement when the other is in action, a spring-catch for moving into the path of one of said pawls when it shall have reached the limit of its movement, and means upon said spring for engaging said oscillatory member to remove said catch from the path of a ratchet-tooth at the beginning of movement of the latter.

13. In a button-hole attachment for sewing-machines, the combination of a feed-actuating mechanism in which is combined a feed-screw, intermeshing gears in operative connection therewith, means for alternately actuating said gears for reversing the direction of movement of said screw, a manually controlled shaft upon which said screw is mounted, said shaft being free to be moved longitudinally within said screw while adapted to cause the rotation of the latter, clutching means for engaging said shaft with the shaft of one of said gears, and yielding means for holding the two in locking engagement with each other; whereby said screw may be manually rotated without disengaging said gears from each other.

14. In a button-hole attachment for sewing-machines, the combination with a cloth-clamp, a feed-screw, feed-mechanism actuated by said screw, a rock-shaft, means for actuating the same, a rocking-member thereon, an oscillatory-member pivoted at its upper end to be actuated by said rocking member, intermeshing gears in operative connection with said feed-screw, a ratchet-wheel positively connected with each of said gears, pawls pivoted upon the lower portion of said oscillatory-member, one for each ratchet-wheel, said pawls having lugs thereon adapted to be engaged by a yoke, a yoke pivoted upon said oscillatory-member and provided with means for alternately engaging one or the other of said lugs to hold the pawl out of engagement with a ratchet wheel, means for yieldingly locking said yoke in one of two extreme positions, and tripping means actuated by said screw for tilting said yoke at predetermined intervals.

15. In a button-hole attachment for sewing-machines, the combination with a cloth-clamp and feeding means, of means for actuating said feeding means, in which is combined a rock-shaft, means for actuating said rock-shaft, a rocking-member on said rock-shaft, an oscillatory member for imparting a step-by-step movement to said feeding means, said oscillatory member having an opening therein to receive said rocking-member, said opening being formed to cause the free end of said rocking member, at predetermined intervals, to bear against one part thereof, and the hub of said rocking-member against another part to lock said oscillatory member against movement.

16. A buttonhole attachment for sewing machines, comprising, in combination, feeding mechanism, a needle-bar and rock-shaft in operative connection therewith, coacting positioning devices mounted upon said rock-shaft, said devices having a plurality of positive, arbitrarily spaced, interacting means thereon for connecting said rock-shaft to said needle-bar, to position the movement of the rock-shaft to needle-bars which vary the limits of their several strokes with respect to the position of the cloth-plate and laterally adjustable means upon said rock-shaft for adapting the connecting devices to varying positions of needle-bar clamps whereby the angle of said connecting devices with said rock-shaft may be accurately fixed and positively maintained while permitting lateral adjustment.

17. In a button-hole attachment for sewing machines, the combination with a cloth clamp-plate and a vibratory plate for imparting longitudinal and lateral movements thereto, of a bottom-plate to form an under support to said cloth-clamp plate and vibratory plate respectively, one portion of said bottom-plate being resilient and formed to yield to adapt itself to bed-plates of varying height, while that part of the bottom-plate upon which one portion of said vibratory plate bears is free to retain its form unchanged; whereby the variations in different bed-plates may be provided for while maintaining a fixed relation between said bottom-plate and said cloth-clamp and vibratory plates.

18. A button-hole attachment for sewing-machines having a rock-shaft operatively connected with a needle-bar, intermediate means for imparting an intermittent movement to a rotary shaft, a rotary shaft, a cam upon said rotary shaft for imparting vibratory movement to a pivoted lever as said rotary shaft is rotated, a pivoted lever in engagement with said cam, a cloth-clamp, a vibratory-plate in operative connection with said pivoted lever, and adjustable means for varying the leverage of the vibratory plate to control the bight of the stitch.

19. A button-hole attachment for sewing-machines, having a cloth-clamp and feeding means, a rock-shaft, means for actuating the same, a rocking member mounted upon said rock-shaft, an oscillatory plate pivoted to swing from a stationary point upon the frame, means upon said plate adapted to be engaged by said rocking member to swing said plate a predetermined distance, pawls pivotally mounted upon said plate for imparting a step-by-step movement to said feeding means, one of said pawls being engaged while the other is idle, a tilting yoke upon said plate for alternately locking one of said pawls out of engagement and means for shifting said yoke at predetermined intervals.

20. A button-hole attachment for sewing-machines having a cloth-clamp and feeding means, a rock-shaft, means for actuating the same, means mounted upon said rock-shaft for actuating an oscillatory-plate, an oscillatory plate, pawls pivotally mounted upon said plate for imparting a step-by-step movement to said feeding means, means for holding one of said pawls out of engagement while the other is active, and means for shifting said holding means to reverse said pawls, said holding means being arranged to release the engaged pawl before permitting the idle one to become engaged.

21. A button-hole attachment for sewing-machines having a cloth-clamp and feeding means, a rock-shaft, means for actuating the same, an oscillatory plate, means in operative connection with said rock-shaft for actuating the same, pawls pivotally mounted upon said plate for imparting a step-by-step movement to said feeding means, a tilting yoke for engaging one of said pawls to hold it out of action during a predetermined interval while leaving the other free to act, and means for shifting said yoke in its relation to said pawls.

In testimony whereof, I have signed this specification in the presence of two subscribing witnesses, this ninth day of January 1913.

WALTER MAECHLER.

Witnesses:
 DAVID H. FLETCHER,
 LESLIE W. FRICKE